2,956,976
Patented Oct. 18, 1960

2,956,976

PLASTISOL CONTAINING A VINYL CHLORIDE POLYMER AND CALCIUM OXIDE

Lionginas Peciura, Ann Arbor, Mich., assignor to Stubnitz Greene Corporation, Adrian, Mich., a corporation of Michigan No Drawing. Filed Oct. 7, 1957, Ser. No. 688,395

4 Claims. (Cl. 260—30.6)

The present invention relates to improvements in composition for making gaskets for air filters using paper impregnated with phenol formaldehyde. Reference may be made to United States Letters Patent No. 2,732,031 for a disclosure of the general type of gasket used in air filters with which the present invention is concerned wherein the ends of the pleated filter paper are disposed in an uncured gasket composition and cured in position to seal the filter paper in the gasket.

Vinyl chloride and vinyl chloride-acetate resins are well known which are essentially insoluble in a plasticizer at room temperatures, but are essentially completely soluble in the same plasticizer at an elevated temperature. When such a mixture is heated, the resin dissolves in the hot plasticizer and when the solution cools, a permanent gel is formed. Such mixtures are called plastisols and they are usually made using "paste" resins mixed with a liquid plasticizer.

It is the object of the present invention to provide an improved composition for the making of gaskets for air filters, the gasket composition serving to hold the air filter unit together as well as serving to provide an effective sealing element for the filter unit. In practice, the uncured composition is placed in a mold defining the form of the gasket and the ends of the pleated paper constituting the filter are immersed in the uncured composition and upon curing the ends of the paper filter are effectively sealed within the cured gasket.

The use of a paste resin plasticized mixture in making gaskets of the aforesaid type is not new. However, it has been found that typical plastisol formulation is not an entirely satisfactory composition for this particular application.

It has been found that in formulating a suitable resin and plastisol for air filter gaskets, it is necessary to provide a composition having rapid fusion, low volatility of fused compound, good cut resistance and the elimination of wicking into the filter paper. Fusion may be controlled by the correct selection of resin and plasticizer. The essential quality of a suitable resin is that it shall be relatively insoluble in the cold plasticizer and yet be highly soluble in the same plasticizer at elevated temperature. It is recognized in the technology of vinyl resins that neither the respective ratio of its co- or interpolymeric ingredients determine the ability of the resin to form a plastisol. For example, of two resins, identical both in polymeric ratios and molecular weights, one will be found to go into the solution in plasticizer at room temperature; the other will not dissolve to significant degree and will form a "paste." What determines the suitability of the resin to form a "paste" appears to be related to the condition of the resin at the surface of the resin particle, and to a lesser degree, to the particle size of the resin. What this condition should be is not as yet well understood, but it is known that resins which are notoriously soluble in the plasticizer can be made insoluble in the same plasticizer by heating the finely divided resin in an inert suspending and heat transfer agent, for example, light paraffin oil.

Since it is not quite understood what condition really exists at the surface of commercially available resin, I cannot "spell out" the above mentioned condition but I have found that resins exemplified by Pliovic AO (a polyvinyl chloride resin) will enable one to raise or lower fusion temperature by its use. Increased quantity of Pliovic AO will lower fusion and decreased quantities will raise fusion. Other resins with the same characteristics as Pliovic AO will work in the same manner.

The specific plasticizer is obviously also involved in controlling fusion, for one plasticizer or a mixture of plasticizers may dissolve the resin while another will not. The resin is very prone to exist in the plasticizer, not as individually dispersed particles, but as large agglomerates and, if these are too large, the viscosity of the compound may be erratic and the fusion uneven. Large agglomerates are prevented by wetting all ingredients thoroughly. This may be done by prolonged grinding or by adding tributyl phosphate or zinc resinate, or a mixture of both, to a mixture of the filler and a portion of the plasticizer, grind this until it is well mixed and uniform, and then add the resin and plasticizer (including low and high solvating power plasticizer) and grind until uniform. I have found that the following plasticizers are best used: Dioctyl phthalate, dioctyl sebacate, tricresyl phosphate, dicapryl phthalate, petroleum fractions high in aromatic and naphthenic hydrocarbons, methyl acetyl ricinoleate, Flexol 8N8 (2,2-ethylhexamido diethyl di-(2-ethylhexoate)) and Flexol CC-55 (di-(2-ethylhexyl) hexahydro phthalate), as well as diisodecyl phthalate, diisodecyl adipate, butyl benzyl phthalate, diisodecyl adipate. There are many other plasticizers that have the same general effect on varying the rate of fusion.

Low volatility of the fused compound is very important. This has been accomplished by using plasticizers with a low vapor pressure. Typical of these plasticizers are: Diisodecyl adipate, diisodecyl phthalate, tricresyl phosphate, or plasticizers of the polymeric type such as soybean epoxy plasticizers known as Paraplex G-62 and G-60, or a high molecular weight polyester plasticizer such as G-25 or the like.

High viscosity alone will prevent "wicking," but since low viscosity is of great importance, I have found that great care must be exercised in formulating and that "wicking" can be controlled by the proper selection of resins. Resins that have gel character and/or resins that have a great deal of affinity for plasticizers will give positive control of wicking. Resins like VYNV-2 (a resinous copolymer of vinyl chloride and vinyl acetate) and Pliovic AO are typical. Gels will inhibit the capillary action of the plasticizers in the filter paper. Resins that have a great affinity for plasticizers will "cake" onto the filter paper and stop the plasticizers from wicking into the filter paper.

I have improved cut resistance by the proper selection of resins and fillers. Resins that have large particle size such as VR-24 (a polyvinyl chloride resin), Geon 202 (a resinous copolymer of vinyl chloride and vinylidene chloride), and QXSM (a polyvinyl chloride resin) will be better than typical "paste" resins. Stiffness and resistance to cutting may be attained by adding fillers which impart slightly thixotropic characteristics to the composition without affecting the flow characteristics of the composition as, for example, calcium carbonate and larger particle size cabonates (150-350 mesh) of low oil absorption are typical of the type of crystalline fillers. This is of particular importance in the manufacture of filter gaskets which have depressed or raised designs.

In the manufacture of air filters of the type described it is the general practice to use filter paper which is impregnated with a phenol formaldehyde resin. Such paper has been found to vary greatly in the degree of phenol formaldehyde reaction.

It is a well known fact that unreacted phenol formaldehyde will split off water when heated to a temperature to cause a reaction. As long as there is any unreacted phenol formaldehyde in the paper there will be moisture (or water) formed when the paper is subjected to elevated temperatures.

Since it is necessary to heat the phenol formaldehyde impregnated paper to temperatures of 350 to 500° F. in order to cure the sealing materials (plastisol) forming the gaskets, any unreacted phenol formaldehyde will cause water vapor to become trapped in the plastisol during cure. This is due to the necessity of imbedding the filter paper in the plastisol before curing and keeping the paper imbedded until the plastisol is cured. The release of any water vapor will produce a bubbling action as it tries to pass through the gasket material being cured. This is deleterious to making high quality air filter units.

I have overcome the problem of moisture release by incorporating a moisture absorbing chemical in the gasket material. This moisture absorbing chemical is a material such as calcium oxide (CaO), or other oxides and mixtures thereof of the second element periodic group, and is added to the sealing material (plastisol) before milling on a three roll mill or other type of typical plastisol processing equipment. There are several grades of CaO on the market and they will all work. However, 95% through 300 mesh is the best grade to use. The only difficulty encountered is that some grades of CaO have a large enough particle size so as to be noticeable in the finished compound. Thus, I have found it necessary to grind the CaO in a ball mill with DOP (a di-(2-ethylhexyl) phthalate plasticizer) when we find the large particles objectionable. However, I claim that the particular method used to incorporate the CaO in the plastisol is not critical as long as one is satisfied with the finished appearance. Experience indicates that 0.5% to 5.0% is most effective. Other amounts can be used if deemed economically feasible.

The following represents the percentage range of the ingredients of my improved composition:

| | Percent |
|---|---|
| (1) Polyvinyl chloride | 40–60 |
| (2) Tricresyl phosphate | 0–5 |
| (3) A member of the class consisting of Di-octyl phthalate, Di-iso-octyl phthalate, Di-octyl decyl phthalate, Di-iso-decyl phthalate, Di-decyl phthalate, Di-iso-decyl adipate, Di-decyl adipate | 20–10 | and mixtures thereof.

| | |
|---|---|
| Di(2-ethylhexyl) hexa-hydrophthalate | 15–10 |
| Calcium carbonate | 15–5 |
| Calcium oxide | 5–0.5 |
| Barium-cadmium stabilizer | 3–1 |

Typical specific formula according to the present invention follows:

| | Percent |
|---|---|
| Polyvinyl chloride | 46 |
| Tricresyl phosphate | 7 |
| Di(2-ethyl hexyl) hexa-hydrophthalate | 14 |
| Di-iso-decyl phthalate | 18.5 |
| Calcium carbonate | 10 |
| Barium-cadmium stabilizer | 1.5 |
| Calcium oxide | 3 |

Having thus described my invention what I claim is new and desire to protect by Letters Patent is:

1. As a new composition of matter useful as a gasket composition for air filters of phenol formaldehyde impregnated paper, a plastisol containing about 20–40% by weight of a plasticizer and about 0.5–5.0% by weight of calcium oxide, the balance being essentially a resin selected from the class consisting of polyvinyl chloride, copolymers of vinyl chloride and vinyl acetate, and copolymers of vinyl chloride and vinylidene chloride.

2. As a new composition of matter useful as a gasket composition for air filters of phenol formaldehyde impregnated paper, a plastisol containing about 40–60% of a resin selected from the class consisting of polyvinyl chloride, copolymers of vinyl chloride and vinyl acetate, and copolymers of vinyl chloride and vinylidene chloride, about 20–35% of a dicarboxylic acid ester, about 5–15% calcium carbonate, about 0.5–5% calcium oxide and about 1–3% of a barium-cadmium stabilizer.

3. A composition as claimed in claim 2, and up to about 5% of tricresyl phosphate to impart low volatility to the plastisol.

4. As a new composition of matter useful as a gasket composition for air filters of phenol formaldehyde impregnated paper, a plastisol containing about 46% polyvinyl chloride, about 7% tri-cresyl phosphate, about 14% di(2-ethylhexyl) hexahydro phthalate, about 18.5% di-iso-decyl phthalate, about 10% calcium carbonate, about 3% calcium oxide, and about 1.5% of a barium-cadmium stabilizer.

References Cited in the file of this patent

UNITED STATES PATENTS

| | | |
|---|---|---|
| 2,609,355 | Winkler | Sept. 2, 1952 |
| 2,626,941 | Habeck | Jan. 27, 1953 |
| 2,647,101 | Humphrey et al. | July 28, 1953 |
| 2,732,031 | Rabbitt et al. | Jan. 24, 1956 |
| 2,753,314 | Severs et al. | July 3, 1956 |
| 2,825,711 | Mayfield | Mar. 4, 1958 |

OTHER REFERENCES

The Condensed Chemical Dictionary, 5th edition, Reinhold Pub. Corp., New York, 1956.